United States Patent [19]
Harris et al.

[11] 3,956,601
[45] May 11, 1976

[54] TELECOMMUNICATIONS ANALYZER

[75] Inventors: Harvey H. Harris, Clearwater, Fla.;
Thomas V. Saliga, San Diego, Calif.;
Luke G. Smithwick, Clearwater, Fla.

[73] Assignee: Paradyne Corporation, Largo, Fla.

[22] Filed: Oct. 17, 1974

[21] Appl. No.: 516,138

[52] U.S. Cl. ............................... 179/175.3 R
[51] Int. Cl.$^2$ ............................... H04B 3/46
[58] Field of Search ........... 179/175.3 R, 175.31 E;
324/57 DE, 57 N, 57 PS

[56] References Cited
UNITED STATES PATENTS

| | | | |
|---|---|---|---|
| 2,988,693 | 6/1961 | Billig et al. | 324/57 N |
| 3,173,999 | 3/1965 | Svala | 179/175.3 R |
| 3,655,915 | 4/1972 | Liberman et al. | 179/175.3 R |
| 3,814,868 | 6/1974 | Bradley | 179/175.3 R |
| 3,846,593 | 11/1974 | Bradley | 179/175.3 R |

OTHER PUBLICATIONS

"Automatic Transmission Measuring-," Phillips Telecommunication Review, Vol. 28, No. 2, 1969, p. 59-87.
"Checking Echo Suppressors," Bell Lab. Record, Mar. 1970, pp. 81-84.

*Primary Examiner*—Douglas W. Olms
*Attorney, Agent, or Firm*—Arthur W. Fisher, III

[57] ABSTRACT

A telecommmunications analyzer for monitoring transmission line performance comprising a transmission line test means including a transmitter means to generate at least one predetermined transmission test signal corresponding to the transmission line parameter under test and a receiver means including a parameter test means to receive and monitor receipt of the predetermined transmission line test signal wherein a local and remote telecommunications analyzer are coupled together over the transmission line to monitor the transmission line parameter under test, and means to record and display the parameter monitored. The telecommunications analyzer may include a control means to provide automatic sequential testing of a plurality of predetermined transmission line parameters. The telecommunications analyzer may also include a modem test integrity means and interface means to monitor and display EIA RS-232 control line performance and modem integrity performance.

40 Claims, 12 Drawing Figures

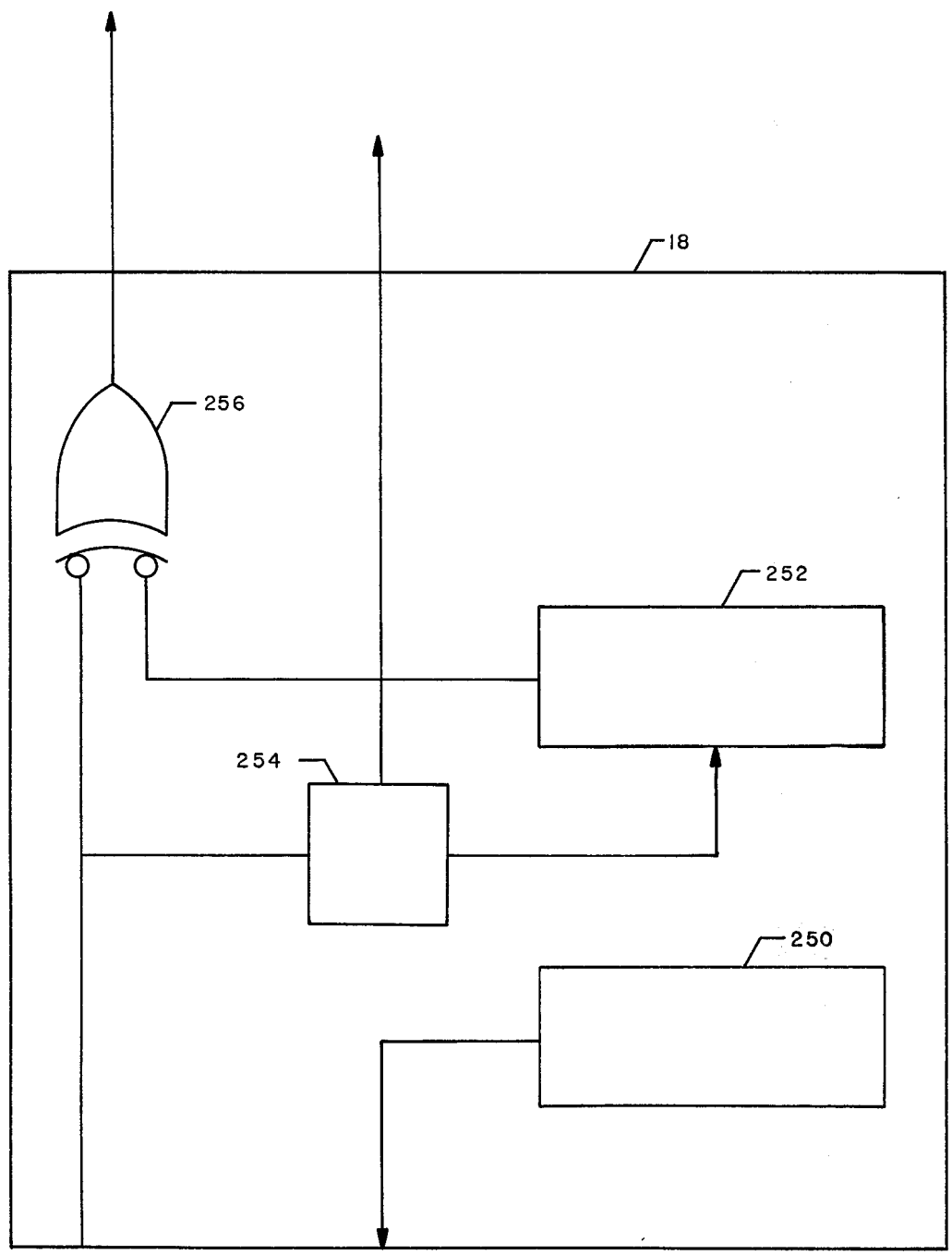

TELECOMMUNICATIONS ANALYZER

BACKGROUND OF THE INVENTION

1. Field of the Invention

This invention relates to a telecommunications analyzer to monitor, record and display transmission line performance and may also include means to monitor modem and interface performance.

2. Description of the Prior Art

Most existing data communication systems requiring an immediate transfer of data between a computer and a distant computer or I/O device normally use voice-grade telephone lines or special dedicated lines between locations as the transmission medium. To transfer data signals over this transmission medium, the DC output signals of the computer or terminal equipment is converted to an audio signal for transmission. At the remote site, the audio signal is reconverted to the original DC pulse signal.

When a data communications user installs his own system, he generally integrates a number of separate components or subsystems such as terminals, modems, printer, interfaces and the like into a complete data communications system. Often these components of subsystems are obtained from different vendors. As a result, once such an integrated system is assembled and operating, the problem of "trouble shooting" system malfunctions are generally compounded due to the various interfaces. All too often, a user's system remains inoperative, while representatives from the various vendors report that they have checked their portion of the system and found that it is operating properly.

Inherently, the transmission medium is subject to numerous environmental conditions which seriously affect various electrical parameters causing these parameters to exceed performance specifications. Specifically, the transmission medium is exposed to gain hits, phase jitter, impulse noise, C message notched noise, nonlinear distortion, frequency response distortion and envelope delay.

In addition, serious failures often arise from incompatibility in line control protocol between terminal and computer, terminal and modem, modem and modem, modem and phone-line interface, and software programs.

A number of test sets are available which test individual performance parameters such as bit-error-rate detecting systems, phase jitter/phase hit meters, impulse noise meters and C-message weighted noise meters. Obviously, when attempting to determine and isolate the source of improper or low system performance, a number of test sets are necessary. The attendant cost of purchasing and maintaining individual test sets may be prohibitive. Moreover, since the performance parameters are constantly changing to varying degrees, the inherent time factor associated in conducting these tests separately are often ineffective.

In addition, these test sets generally require a skilled technician to conduct and interpret the test results. Furthermore, there are usually no provisions for recording the test results which would allow for a more thorough analysis of the performance parameters with respect to time.

Thus, a need exists for an inexpensive portable system analyzer capable of monitoring, displaying and recording transmission line performance parameters with respect to time, simple enough for an unskilled technician to interpret and evaluate.

SUMMARY OF THE INVENTION

This invention relates to a telecommunications analyzer for monitoring transmission line performance, modem integrity and interface operations. More specifically, the telecommunications analyzer comprises a transmission line test means to sense, display and record transmission line performance, modem integrity test means to monitor bit error rate performance and interface test means to monitor various signals.

It is envisioned that the transmission line test means may be integrated into an existing data transmission system to provide automatic adaptive system performance responsive to changes in the transmission line performance. Moreover, the telecommunications analyzer may include means to provide automatic sequential testing of a plurality of predetermined transmission line parameters as more fully described hereinafter. For purposes of discussion and description the telecommunication analyzer described hereinafter includes provision for automatic sequential testing.

The transmission line test means comprises a transmitter means, receiver means, control means, display means, alarm means and signal summing means. The transmitter means includes circuitry to generate a test signal pattern and control signal corresponding to each transmission line parameter to be tested in response to command signals from the control means. The receiver means includes a circuitry to filter and isolate the test pattern signal in response to incoming control signals corresponding to each transmission line parameter. The receiver means circuitry also includes a parameter test means to selectively monitor the incoming test pattern signals corresponding to the particular transmission line parameter under test; such as gain hits, phase jitter, C-message noise, impulse noise, non-linear distortion, frequency response, envelope delay, echo suppressor check and frequency offset.

The control means includes a digital sequencer means to automatically generate command signals. The command signals sequentially advance the transmitter means to automatically test each of the transmission line parameters. The control means further includes digital-to-analog signature generator means to generate a discrete signal corresponding to each incoming control signal and also mode control means to control the test modem which include the transmission line test, modem integrity test and interface test.

The interface test means comprises circuitry coupled between the terminal, modem and telephone data access lines to a monitor various RS-232 control lines such as clock, clear set ready, clear and carrier detect. The interface test means includes indicator means to automatically display the various "on-line" signals during operation of the data communications system.

The modem integrity test means comprises a transmission line simulator and modem test signal generator means to generate an analog/digital local modem to monitor bit-error-rate of the modem with a multi-level noise insertion from the control means of the transmission line test means.

When in the transmission line test mode, a local telecommunications analyzer is coupled to a remote telecommunications analyzer over the transmission lines to be tested.

The transmission line parameters may be tested automatically in sequence or individually as controlled by the mode control means. For purpose of discussion, the transmission line parameters will be tested automatically. Initially, the local telecommunication analyzer is activated when the digital sequencer means generates a command signal fed to the transmitter means. The transmitter means generates a predetermined test pattern signal and control signal corresponding to the particular transmission line parameter under test. The test pattern signal and control signal are fed to the signal summing means which generates a transmission line test signal comprising the test pattern signal and control signal for transmission over the transmission lines to the remote telecommunications analyzer. The received signals are demodulated to recover the control signal and filtered to isolate the particular test pattern to the parameter test means corresponding to the particular transmission line parameter under test. The recovered control signal is fed to the sequencer means which generates a command signal corresponding to the particular parameter under test. This command signal is fed simultaneously to the receiver means to control the filtering of the test pattern and to the signature generator means to generate the signature signal corresponding to the parameter under test. The test pattern signal is fed to the parameter test means to monitor the test pattern signal for transmission line performance for a predetermined time. The sequencer means then automatically advances the transmission line test means to the subsequent test until terminated by the operator.

During the parameter test, the signature signal transmission line performance signal for each parameter test are multiplexed to the display means to permanently record the transmission line performance. A template is provided to overlay the recorder with minimum - maximum performance specifications for each transmission line parameter. This provides a visual time relation examination of the line performance. Thus, transmission line performance may be examined with relation to the overall telecommunications system performance to isolate system problems attributed to transmission line performance.

When in the modem integrity test mode or interface test mode, the telecommunications analyzer is coupled to a local modem. The modem test signal generator means generates a digital modem integrity test signal which is fed to the modulator of the modem to generate an analog signal. The analog signal is fed to the transmission line simulator means where a multi-level noise signal is injected into the analog signal and returned to the demodulator of the modem. The demodulated digital signal is returned to the modem test signal generator means where it is compared with a reference noise signal identical to the digital test signal sent to generate a modem integrity performance signal. This modem integrity performance signal comprises a first signal when no error is detected and a second signal when an error is detected. The multi-level noise is increased through a plurality of levels. As a result, the injected noise should eventually generate an error. Thus, modem integrity is monitored. The modem integrity performance signal is then fed to the display means to record the modem integrity performance.

During the interface test mode the telecommunications analyzer means monitors and displays the presence of the plurality of predetermined signals from the RS-232 interface.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 12 is a block diagram of the modem test signal generator means.

Similar reference characters refer to similar parts throughout the several view of the drawings.

DETAILED DESCRIPTION OF THE PREFERRED EMBODIMENT

Figure 1:
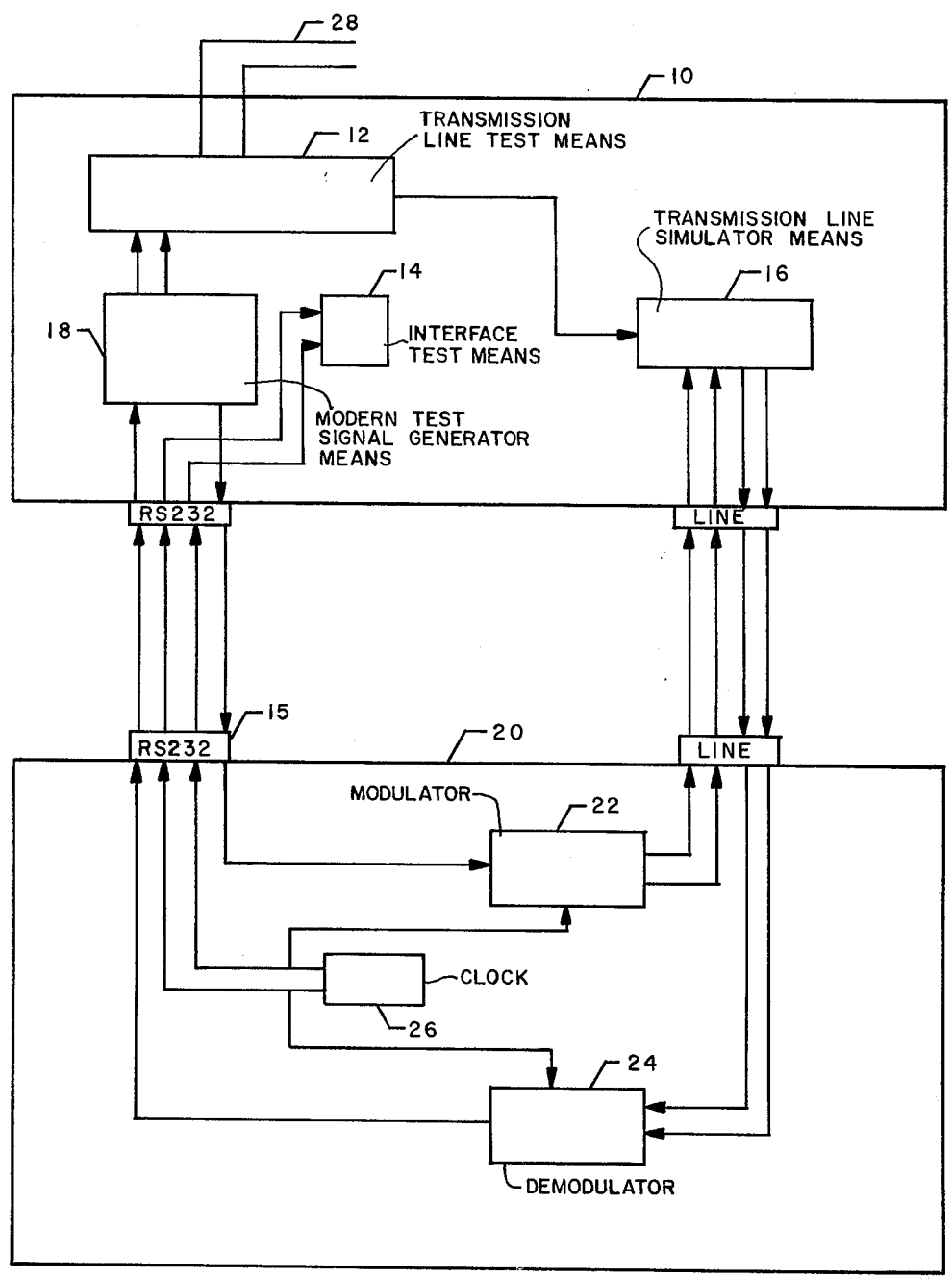
FIG. 1 is a block diagram of the telecommunications analyzer of the present invention.

As shown in FIG. 1, the telecommunications analyzer of the present invention generally indicated as 10 comprises transmission line test means 12, interface test means 14, and modem integrity test means including transmission line simulator means 16 and modem test signal generator means 18.

The telecommunications analyzer is coupled to a modem generally indicated as 20 which permits performance of the interface and modem integrity tests as more fully described hereinafter. The modem 20 includes modulator 22, demodulator 24 and clock 26. The telecommunications analyzer 10 is coupled to a remote telecommunications analyzer through transmission lines 28 to perform the transmission line tests as more fully described hereinafter. Thus, the telecommunications analyzer 10 has full access to modem 20, RS-232 digital and voice frequency interface 15 and transmission lines 28 permitting analysis of at least one transmission line parameter between a local and remote site as well as modem integrity and interface test operation. For the purpose of both brevity and clarity, both the local and remotely located telecommunications analyzer will be disclosed and explained in detail with the telecommunications analyzer represented in FIGS. 1 and 10.

It is envisioned that the transmission line test means 12 may be integrated into an existing data transmission system to provide automatic adaptive system performance responsive to changes in the transmission line performance. Moreover, the telecommunications analyzer may include means to provide automatic sequential testing of a plurality of predetermined transmission line parameters as more fully described hereinafter. For purposes of discussion and description the telecommunications analyzer described hereinafter includes provision for automatic sequential testing.

Figure 2:
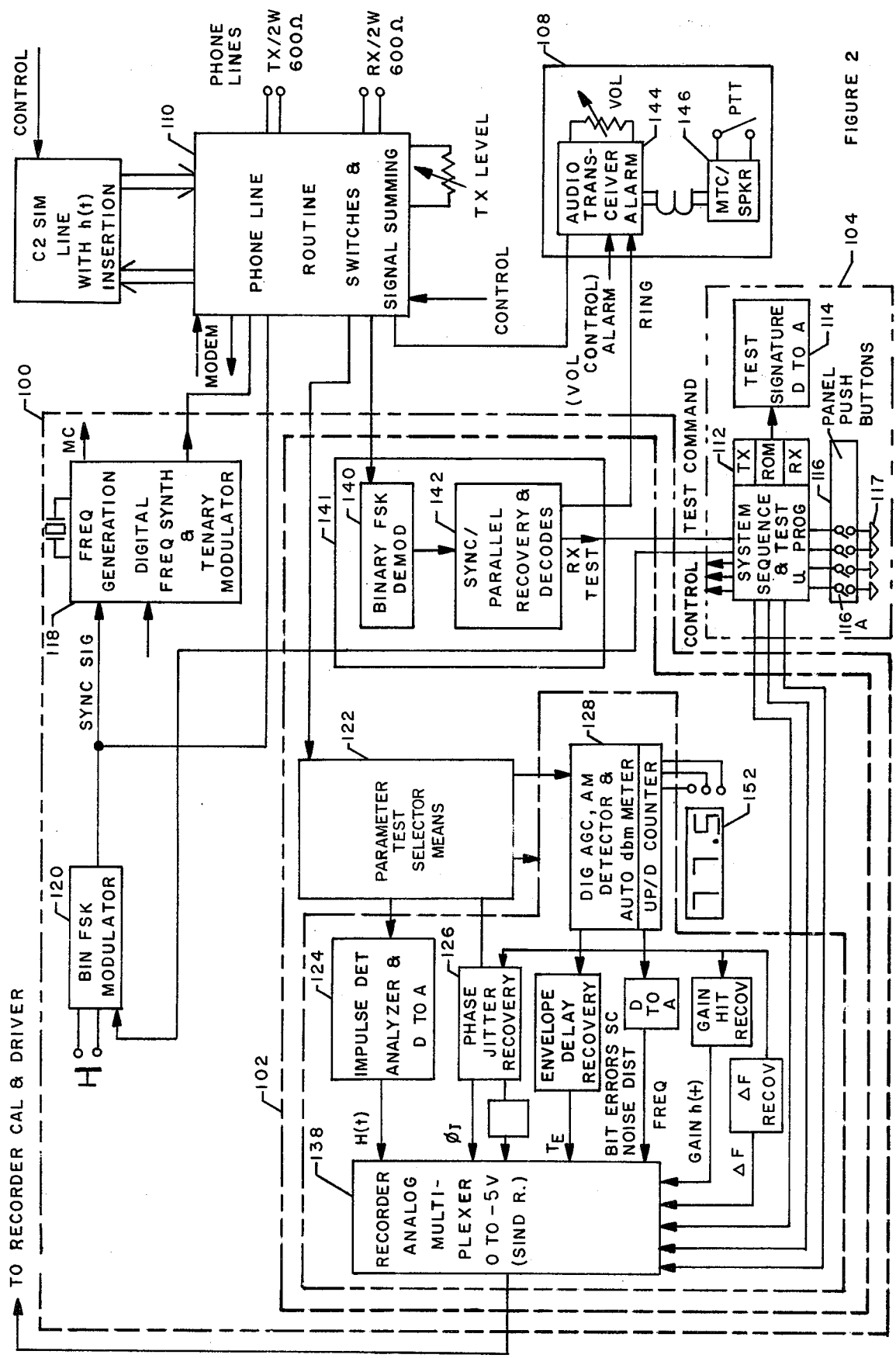
FIG. 2 is a detailed block diagram of the telecommunications analyzer including a schematic of pertinent associated circuitry.
Figure 3:
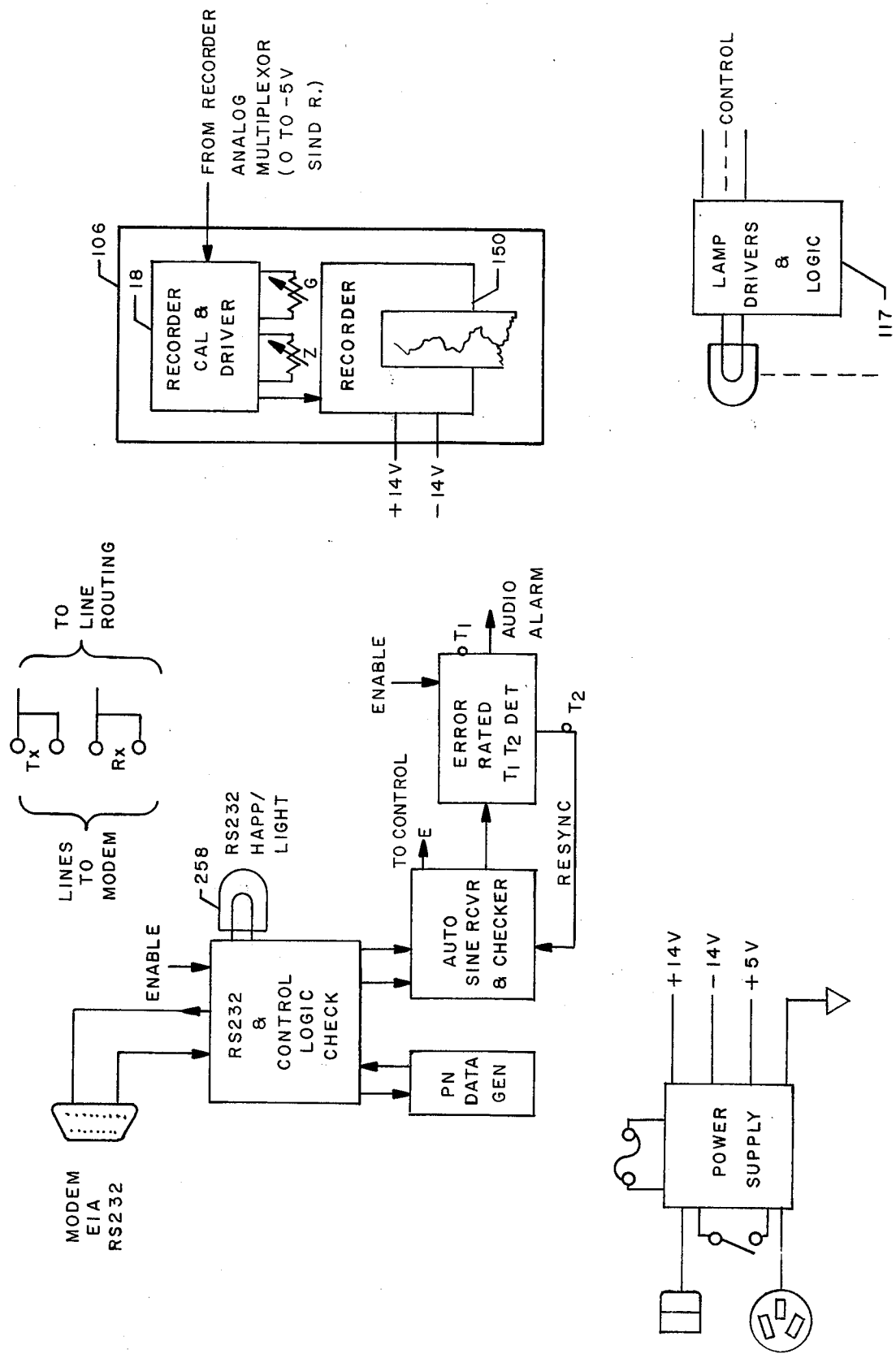
FIG. 3 is a view of the front control panel of the telecommunications analyzer.

When operating in the transmission line test mode as described more fully hereinafter any one of the following transmission line parameters may be selectively recorded and displayed:

Gain Hits
Phase Jitter
C-Message Noise
Impulse Noise
Non-Linear Distortion
Frequency Response
Envelope Delay
Echo Suppressor Check
Frequency Offset FIG. 2 is a detailed block diagram of the telecommunications analyzer 10. The transmission line test means 12 (FIG. 1) comprises transmitter means 100, receiver means 102, control means 104, display means 106, alarm means 108 and signal summing means 110. Control means 104 comprises digital sequencer means 112, digital-to-analog (D-A) signature generator means 114 and mode control means 116 including multiple switch means 116a through 116q and lamps 117a through 117q (FIG. 3). As discussed more fully hereinafter, the mode control means 116 controls the operation and display of the interface and modem integrity tests as well as the transmission line test. Digital sequencer means 112 comprises a multiple bit read-only-memory (1024 bits) which generates micro-program commands to all subsystems. Signature generator means 114 includes logic means to generate a control signal comprising a discrete level corresponding to each individual transmission line test along with full and minimum scale levels as more fully described hereinafter. Multiple switch means 116 comprises a plurality of switches, each corresponding to one of the transmission line parameters to be measured as listed above and the interface/modem tests (FIG. 3).

The transmitter means 100 comprises a transmission line test signal generator means 118 and control signal generator means comprising binary FSK modulator means 120. The transmission line test signal generator means 118 comprises a frequency generator means 119, digital frequency synthesizer 121 and amplitude modulator 122 as indicated. As shown, the output of the transmission line test signal generator means 118 is fed directly to the signal summing means 110 while the output of the frequency shift key modulator 120 is fed simultaneously to the transmission test signal generator means 118 and signal summing means 110.

The receiver means 102 includes a parameter test selector means comprising digital selective receiver filters and gain scaling means 122 having a 15 kilohertz lowpass filter, 1200 hertz highpass filter, 1500 bandpass filter and C-message notch filter. The output of digital selective receiver filters and gain scaling means 122 is fed selectively to the parameter test means 123 as more fully described hereinafter. The parameter test means 123 comprises impulse analyzer and digital to analog convertor means 124 and phase jitter recovery means 126. Digital automatic gain control and amplitude modulator detector, auto DBM meter 128, as more fully described hereinafter, selectively feed envelope delay recovery means 130, digital-to-analog convertor means 132, gain hit recovery means 134 and frequency offset recovery means 136. The output of each of these subsystems is fed to analog multiplexer means 138 as more fully described hereinafter. Receiver means 102 further includes control signal recovery means 141 comprising a binary FSK demodulator means 140 and sync/parallel recovery and decoder means 142. Signals are received through the signal summing means 110 and fed simultaneously to filter and gain scaling means 122 and binary FSK demodulator means 140 as well as alarm means 108 which comprises audio alarm means 144 and mike speaker 146. The output of demodulator means 140 is fed to decoder means 142 to recover the discrete control signal corresponding to the line parameter under test. This control signal is fed simultaneously to control means 104 and alarm means 108 as more fully described hereinafter.

Display means 106 comprises an analog display means including calibrator and driver means 149 and recorder means 150 which are fed from multiplexer means 138. Analzyer 10 also includes digital display means 152 as more fully described hereinafter. The display means 106 comprises a heat sensitive paper and heated pen with means to advance the paper with respect to time by applicable structure commonly known in the industry.

FIGS. 4 through 10 are block diagrams of a transmitting and receiving telecommunications analyzer 10 and 12 respectively, depicting the operative configurations for the individual transmission line parameter tests and are not intended to be comprehensive but merely illustrative of the particular test described.

Figure 4:
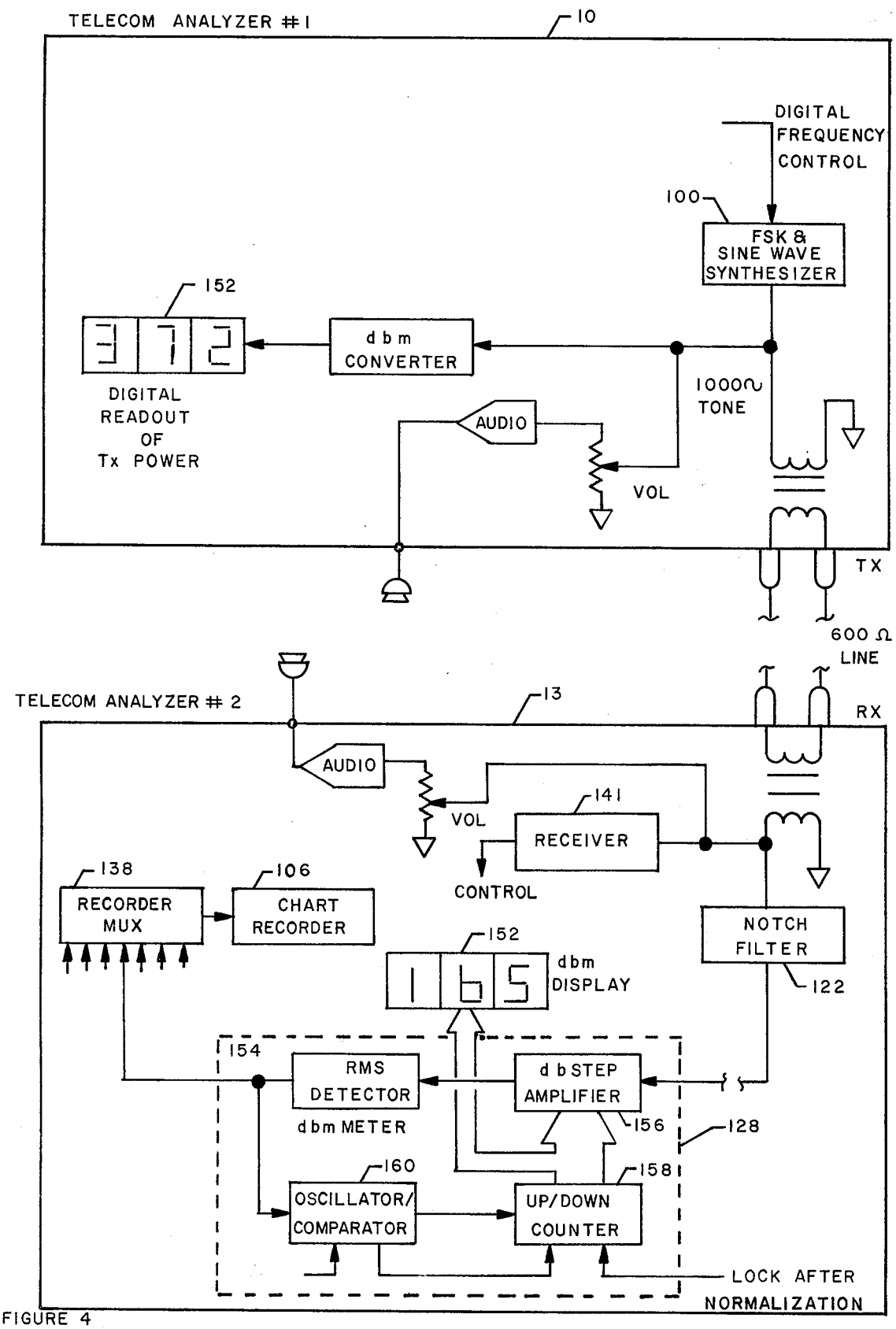
FIG. 4 is a partial block diagram of the gain hits configuration and schematic representation of associated circuitry.

FIG. 4 shows a block diagram of the gain hit configuration including DBM meter 128 comprising an automatic gain control means including RMS detector 154, DB step amplifier 156, up-down counter 158 and oscillator/comparator 160. As shown, a continuous 1000 hertz sine wave is transmitted over the transmission lines 28. As with all the transmission line tests, the output power is monitored at the transmitting site on digital display means 152. The incoming transmission line test signal is fed to the control signal recovery means 141 to recover the digital control signal. The digital control signal is then fed to the control means 104 which generates a command signal corresponding to the transmission line parameter under test. This command signal is fed to the parameter test selector means 122. As shown, the test pattern signal is filtered through the parameter test selector means 122 and fed to the DBM meter 128 which, as previously described, is a closed loop AGC circuit.

The incoming test pattern signals are fed to the step amplifier 156 which comprises a plurality of cascaded amplifiers. The output of step amplifier 156 is fed to RMS detector 154 which detects the RMS value of the filtered incoming test pattern signal. This signal is then fed to oscillator/comparator means 160 which compares the RMS value of the incoming signal to a predetermined reference voltage and generates a correction signal in response to the difference thereof. The correction signal is fed to up/down counter means 158 which controls the gain of step amplifier 156 and feeds display means 158 to provide a digital display of the automatic gain which is equivalent to the net line loss. After a predetermined period of time for normalization, up/down counter means 158 is "locked" to establish a reference signal level against which the incoming signals are compared as a measure of line performance. Multiplexer means 132 multiplexes a zero scale and full scale reference signal from sequencer means 112 followed by a test signature signal. The RMS value measured by detector 154 is fed through gain hit recovery means 136 and multiplexer means 132 to recorder 106. Thus, a visual indication of the gain hits and drop outs compared with the "locked" AG signal is provided. This test will continue for thirty seconds at which time the sequencer means 112 will automatically transition to the second or phase jitter test.

Figure 5:
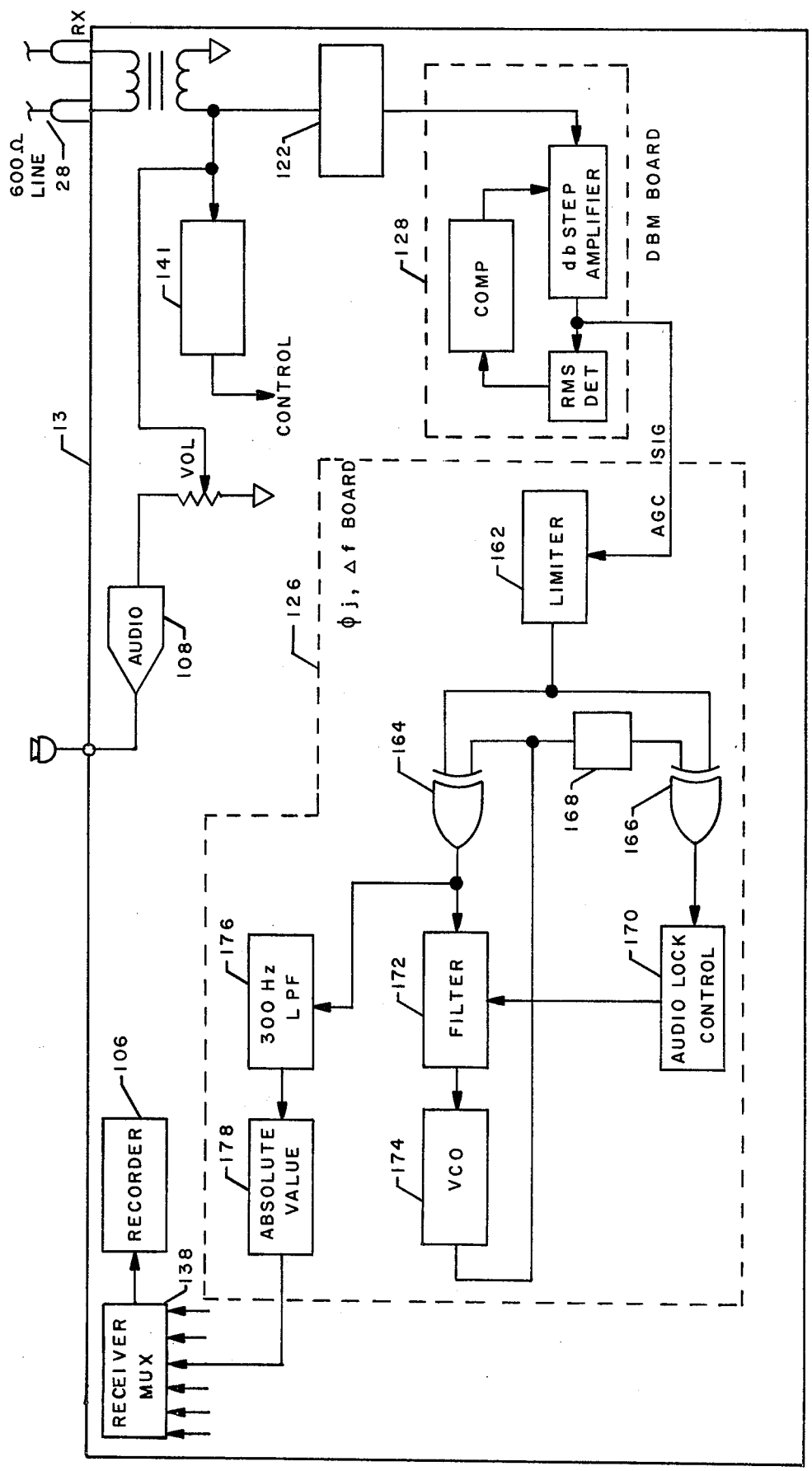
FIG. 5 is a block diagram of a portion of the phase jitter configuration and schematic representaion of associated circuitry.

As shown in FIG. 5, phase jitter recovery parameter test means 126 includes limited 162, phase comparators 164 and 166, 90 degree phase shift means 168, lock control means 160, filter means 172, voltage controlled oscillator means 174, filter means 176 comprising 300 hertz LPF and detector means 178 comprising absolute valve and peak valve detector. As descried hereinafter, phase jitter recovery parameter test means 126 generates an output signal proportional to the phase shift of incoming signals against the established reference.

Specifically during the phase jitter test, the transmitting telecommunication analyzer 10 generates a continuous 1650 hertz sine wave which is transmitted over the transmission lines 28 to the receiving remote telecommunications analyzer 13 for 30 seconds. The 1650 hertz signal is filtered through a C- message 2800 hertz notch filter of the parameter test selcetor means 122 which is fed to DBM meter means 128 which generates of an AGC signal in contrast to the RMS signal as previously described. This AGC signal is fed to limiter means 162 of the phase jitter recovery parameter test means 126. Limiter means 162 generates a square wave form in response thereto. The square wave is fed to phase comparators 164 and 166. The output of phase comparator 166 is fed directly to automatic search lock control means 170 and fed thorugh filter 172 to voltage controlled oscillator means 174 and from thence to 90 degree invertor 168 and phase comparator 164. Lock control means 170 includes logic to generate a "locked" control signal when the imputs to phase comparator 164 and 166 are 90 degrees out of phase. At this point, the output from limiter means 162 and the voltage control oscillator 174 are compared by phase comparator 164 to generate a phase error signal which is fed directly to 300 hertz LPF 176. The filtered phase error signal is fed to absolute value and detector means 178 to generate an output signal representative of the phase jitter which is fed directly to recorder multiplexer 138. As previously described, the signature generator means 114 generates a zero scale and full scale signal followed by a test signature which is multiplexed and displayed before the detected phase jitter.

Figure 6:
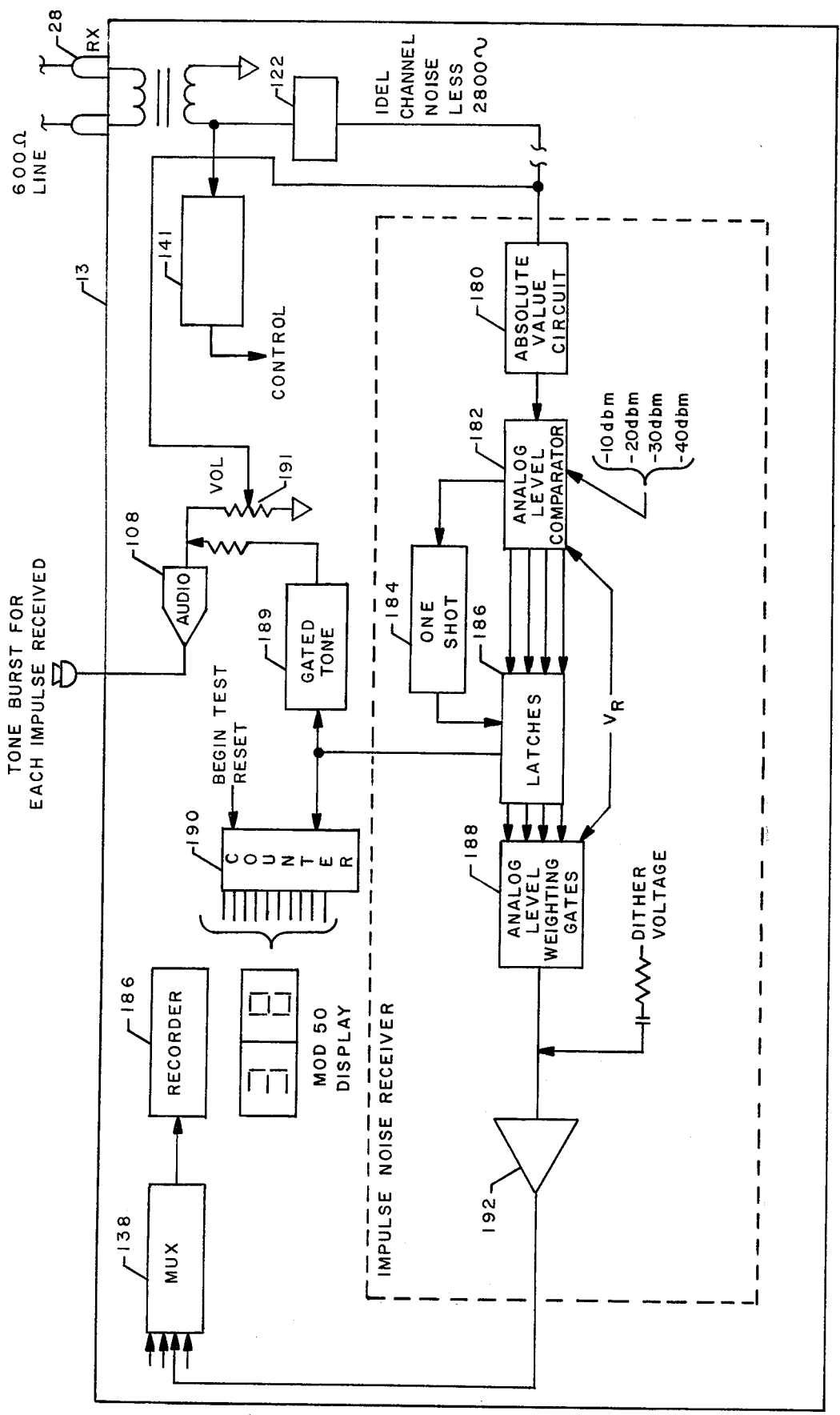
FIG. 6 is a block diagram of the impulse noise configuration and schematic representation of the associated circuitry.

As shown in FIG. 6, impulse noise detector parameter test means 142 includes absolute value circuit 180 which derives the absolute value of the incoming analog test signal. This absolute value is fed directly to analog travel comparator means 182 where it is compared to a plurality of predetermined voltage levels. The output of comparator means 182, which is representative of one of the predetermined voltage levels, is fed simultaneously to one shot multivibrator 184 and a plurality of latches or switch means 186. The output of one shot multivibrator means 184 is fed to switch means 186. The output of switch means 186 is fed to analog level weighing gates 188 and counter means 190. The output of analog level weighting gates 188 is then fed through amplifier 192 to multiplexer 138. The impulse noise detector means 124 thus compares the absolute value of the incoming signal to the plurality of predetermined signal levels to generate a discrete level representative of the line noise level.

During the impulse noise detector test, the transmitting telecommunication analyzer 10 generates a continuous 2800 hertz sine wave which is transmitted to the receiving telecommunication analyzer 13 for 30 seconds. The incoming test signal is filtered through the 2800 hertz C-message notch filter such that the output represents the idle channel noise. This signal is fed to the absolute valve circuit logic 180 which, as previously described, generates a DC voltage which is fed to analog comparators 182. The analog value is compared with the comparators and a signal is generated representative of one of the predetermined discrete levels. The signal is fed to latches 186 and multivibrator 184. The output of latches 186 are controlled by one shot multivibrator 184 to delay the output thereof. The discrete latch output is then fed to analog level weighing gates 188 and op amp 192. The amplified signal is then fed to multiplexer means 138. As with the previous tests, a zero scale/ full scale signal and corresponding test signaature signal precede the measured impulse noise signaal. In addition, the impulse noise is fed through gate 189 to alarm means 108 to provide an audio signal when above a predetermined level controlled by volume control 101.

Figure 7:
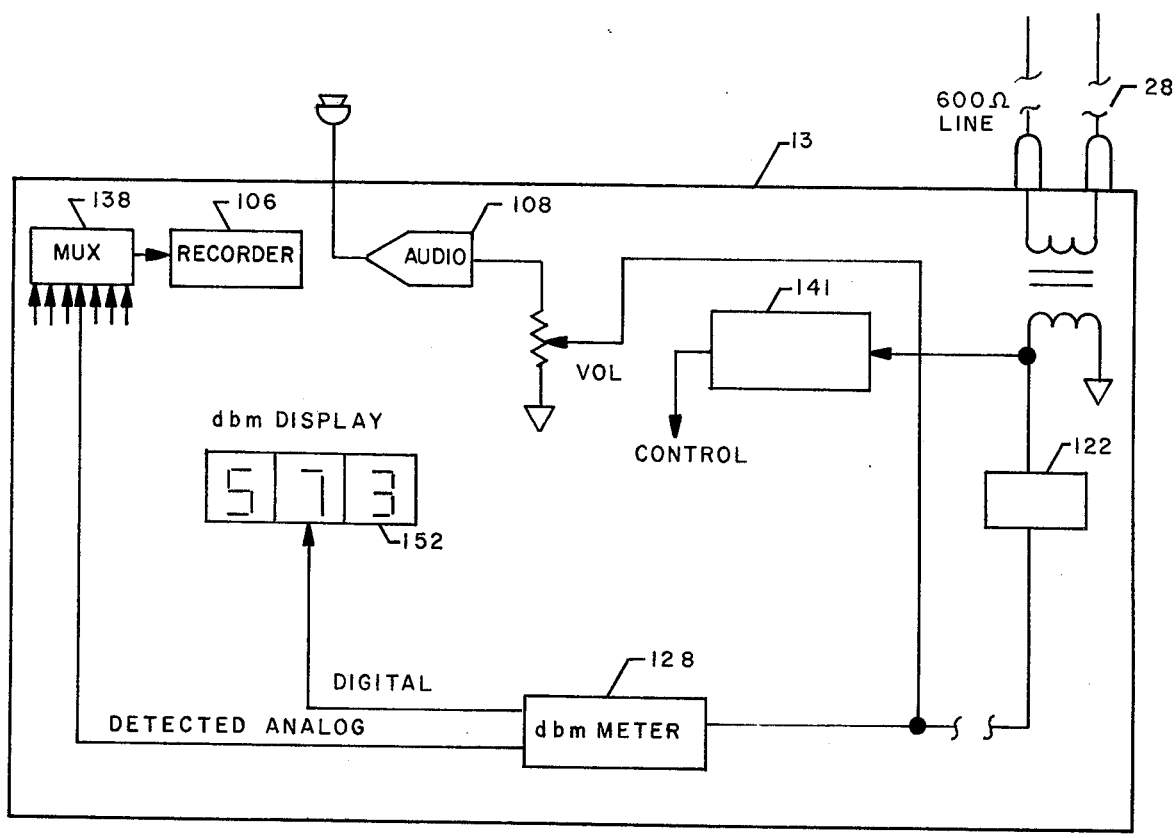
FIG. 7 is a block diagram of the C message noise test and nonlinear distortion configuration and schematic representation of the associated circuitry.

FIG. 7 is a partial block diagram of the C-message noise test and non-linear distrotion test. During the C-message noise test, a continuous 2800 hertz sine wave is filtered through the C-message notch filter and fed directly to DBM meter 128 where, as previously described, the incoming signal is converted to a detected RMS analog signal fed directly to multiplexer 138. In addition, the analog value is converted by the up/down counter to a digital value and fed directly to the DBM display 152. The digital value is fed through D-A convertor 132 to multiplexer 138. As previously described, the 2800 hertz signal is multiplexed with the zero full scale signals and corresponding test signature signal for display on recorder means 106. During the non-linear distortion test, the transmitting telecommunication analyzer 10 generates in sequence; a 1500 hertz sine wave, 750 sine wave, 750 sine wave with 12 hertz AM, 500 hertz sine wave, 500 hertz sine wave with 12 hertz AM, each for 6 second intervals to generate the second and third harmonic of the basic 1500 signals. The transmitted signal is received by the remote telecommunications analyzer 13 and fed through the 1500 hertz BPF and thence to DBM meter 128 where the DBM meter 128 generates an analog and digital signal as previously described. The digital value is fed through D-A convertor 132 to multiplexer 138. As previously described, the shaped 2800 hertz signal is multiplexed with the zero/full scale signals and corresponding test signature signal for display on recorder means 106.

Figure 8:
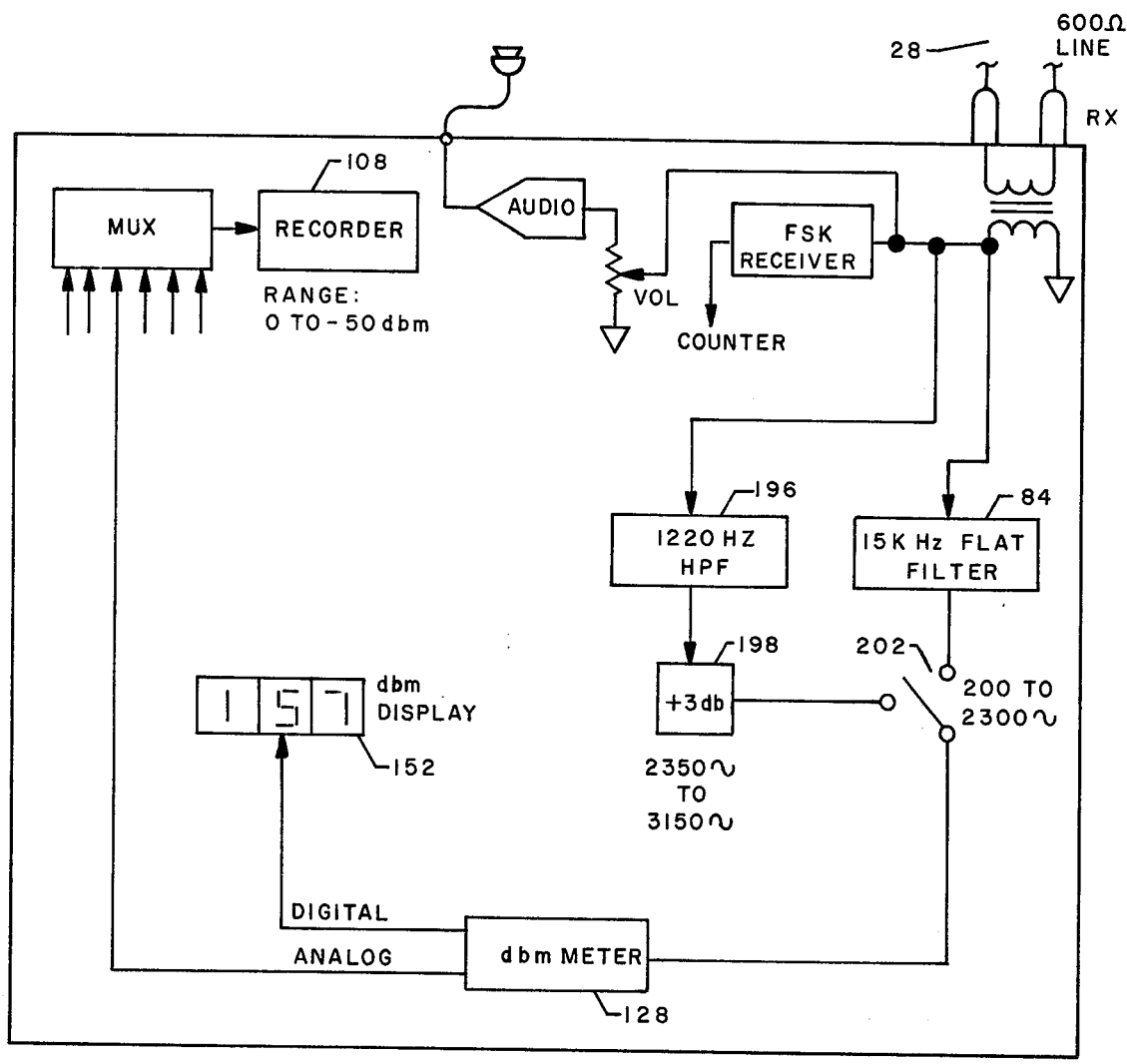
FIG. 8 is a block diagram of the frequency response configuration and schematic representation of the associated circuitry.

As shown in FIG. 8, the frequency response test is similar to the C-message noise test and non-linear distortion test as previously set forth. However, the test signal is incrementally stepped from 200 hertz to 3150 hertz in 50 hertz increments. Since transmission lines are designed to disconnect the line at 2600 hertz, the frequency response test includes reducing the test signal by 3DB and adding an additional side tone of 400 hertz from 2350 hertz to 3150 hertz. The analyzer filter/scaling means 122 includes 1220 hertz high pass filter 196, amplifier 198, 15 kilohertz flat filter 200 and switch means 202 controlled by control means 104. The incoming test signal is selectively fed through either filter 196 or 200, switch means 202 to DBM meter 128 which generates digital feed to DBM display 152 respectively, and analog outputs representative of signal level in time relation to frequency changes. The digital value is fed through D-A convertor 132 to multiplexer 138. As previously described, the shaped 2800 hertz signal is multiplexed with the zero/full scale signals and corresponding test signature signal for display on recorder means 106.

Figure 9:
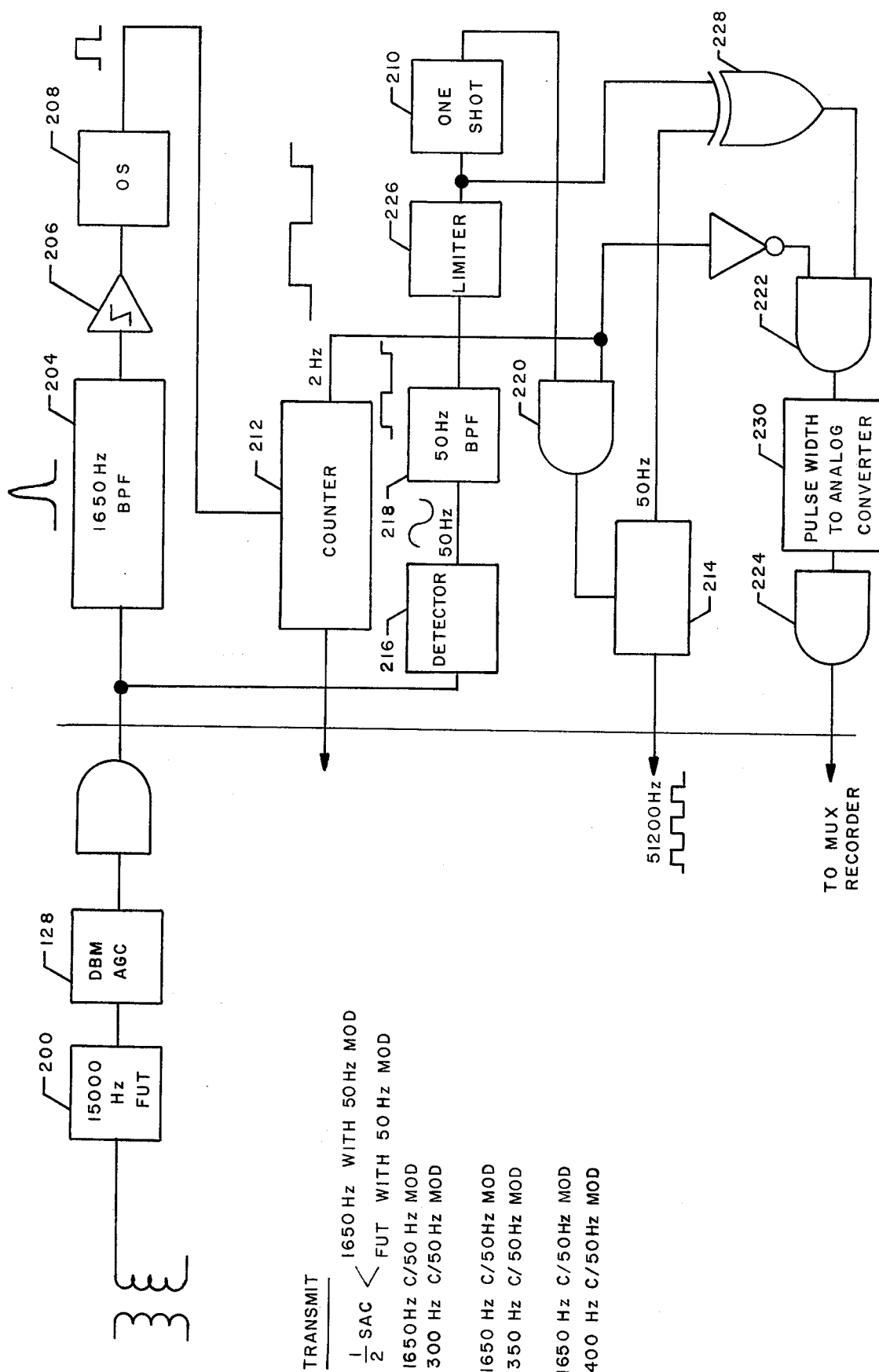
FIG. 9 is a block diagram of the envelope delay recovery configuration and schematic representation of associated circuitry.

As shown in FIG. 9, envelope delay recovery means 130 comprises 1650 hertz bandpass filter 204, operational amplifer 206, first and second one-shot multivibrators 208 and 210 respectively, first and second counter means 212 and 214 respectively, detector means 216, 50 hertz bandpass filter 218, first and second AND gates 220 and 222 respectivley, inverter means 224, limiter 266 phase comparator means 228 and pulse width analog convertor means 230. During the envelope delay, envelope delay recovery means 130 receives incoming test signals through 1500 hertz flat filter 200 and DBM meter 128. The transmitting telecommunication analyzer 10 transmits a reference voltage of 1650 hertz sine wave test frequencies with one cycle of 25 hertz modulation from 300 hertz to 300 hertz at 50 hertz increments. The received signals are filtered through 15,000 hertz flat filter 200 and thence to DBM board 128 where the RMS, AGC signal is generated and fed directly to envelope delay recovery means 130. The AGC signal is phase compared to generate an analog signal representative of the envelope delay experience over the transmission medium.

As previously described, the test signal is multiplexed with the zero/scale signals and corresponding test signature for display on recorder means 106.

Figure 10:
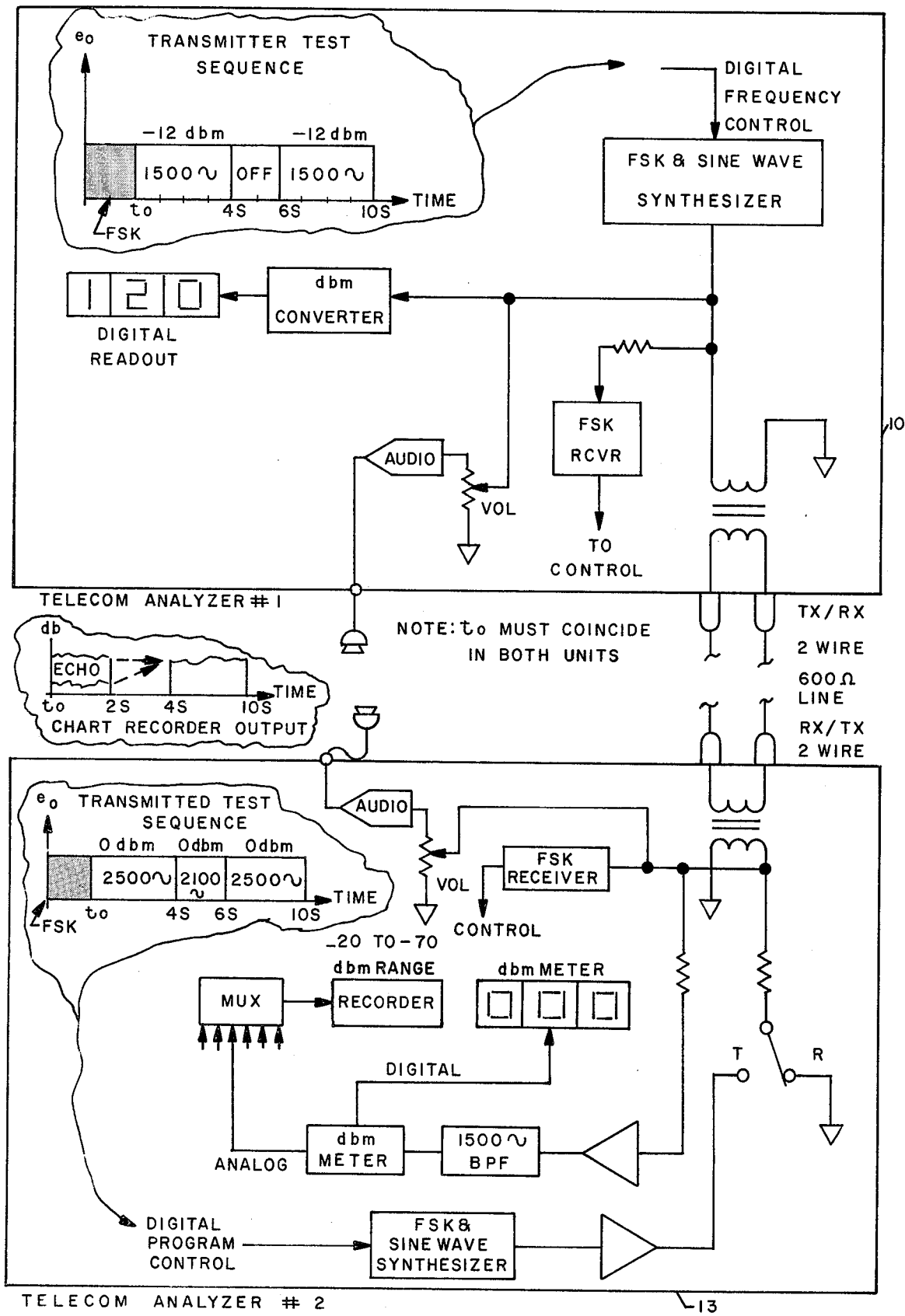
FIG. 10 is a block diagram of the echo suppressor configuration and schematic representation of the associated circuitry.

Commonly, long distance phone lines require echo suppressors to prevent echos from being generated at the interface between the conventional two wire phone lines and the micro-wave links. These normally suppress the weaker signal on the link to maintain a undirectional link at any particular instant. Since data transmissions generally transmit signals in both directions simultaneously at differnet frequency spectrums, it is necessary to disable the echo suppressors. As shown in FIG. 10, the echo supressor test requires transmission of a test signal from the receiving analyzer 13 to exercise the compandors. Initially, both the local and remote analyzers 10 generate signals simultaneously, the local signal being of less strength relative to the remote signal. With the echo suppressor on line the remote receiving analyzer 13 will not receive the lower signal.

A signal of 2100 hertz is transmitted from the receiving site for 400 to 500 micro-seconds to disable the echo suppressor permitting bidirectional transmission notwithstanding the difference in signal strength. As a result, the incoming test signal is fed through 1500 hertz bandpass filter to DBM meter 128 where digital and analog signals indicating the effectiveness of the compandors are generated as previously described, the test signal is multiplexed with the zero/full scale signals and corresponding test signature for display on recorder means 106.

Figure 11:
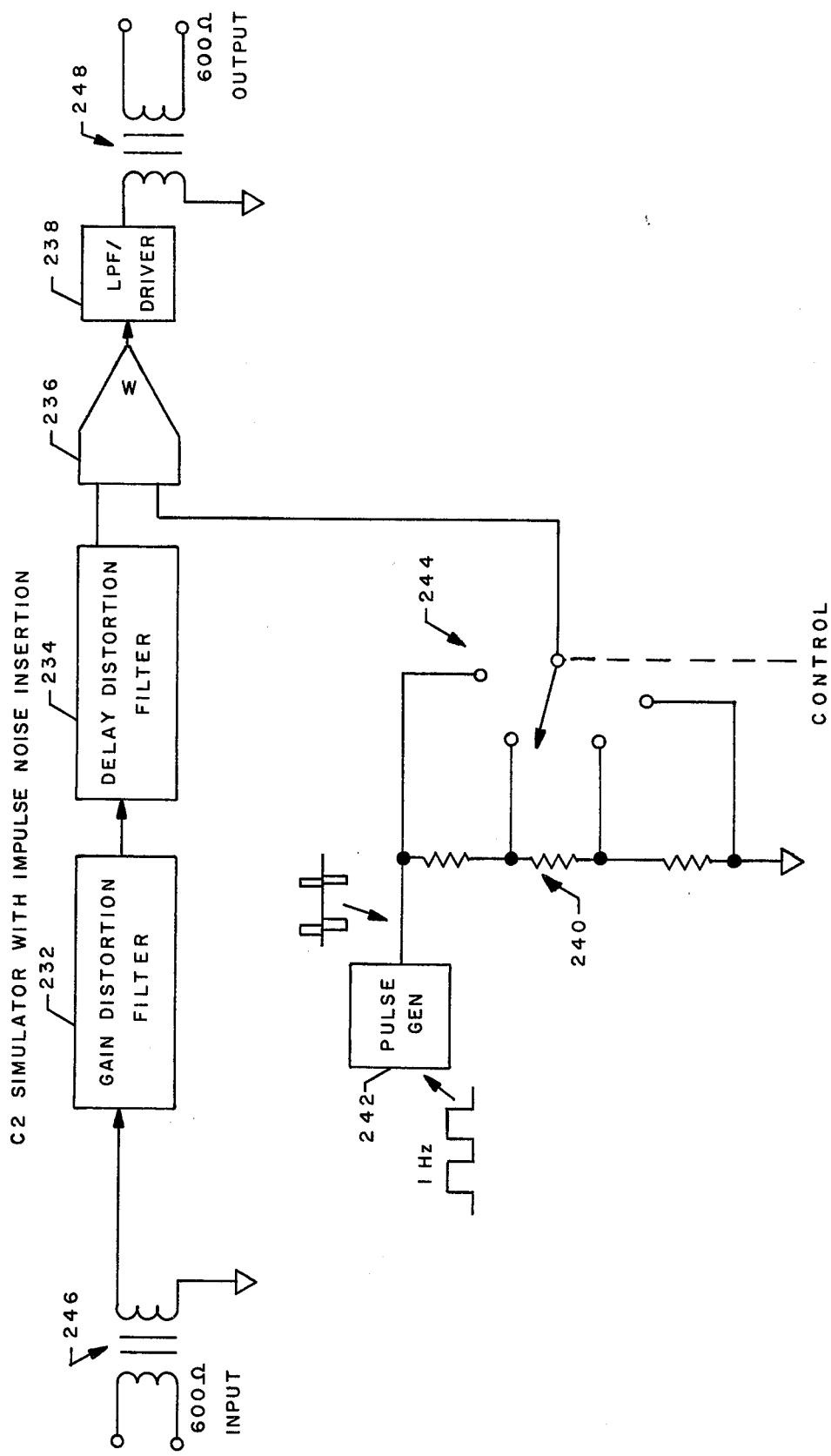
FIG. 11 is a block diagram of the transmission line simulator means and schematic representation of the associated circuitry.

FIG. 11 is a detailed block diagram of the transmission line simulator means 16. As shown, transmission line simulator means 16 comprises a C-2 line simulator including gain distortion filter 232, delay distortion filter 234, op amp 236, low pass filter/drive 238 and multi-level noise injector means 240, comprising pulse generator 242, voltage divider and switch means 244. As described more fully herinafter, the analog modem integrity test signal is fed through imput means 246 to gain delay distortion filter 232 and delay distortion filter 234 which induces characteristic transmission line distortion. The distorted modem integrity test signal is then combined with the multi-level noise from multilevel noise injector means 240 by op amp 236 and fed through low pass filter/driver 238 and output means 248 to the modem 20 (FIG. 1) where it is demodulated and fed to the test signal generator means 18 (FIG. 12). The injected noise is varied by switch means 244 which is controlled through command signals from the control means 104 by means known in the art.

FIG. 12 is a detailed block diagram of the modem test signal generator means 18. As shown, the modem test signal generator means 18 comprises a first and second pseudo noise generator 250 and 252 respectively, synchronization means 254 and comparator means 256. The modem test signal generator means generates the digital modem integrity test signal from P-N generator 250 which is fed to the modulator 22 to generate an analog signal which is fed to the transmission line simulator means 16 where the multi-level noise is injected into the analog signal and returned to the demodulator 24. The demodulated digital signal is returned to the modem test signal generator means 18 where it is compared with the digital pseudo noise signal of P-N generator 252 to generate a modem integrity performance signal. This modem integrity performance signal comprises a first signal when no error is detected and a second signal when an error is detected. The mulitlevel noise is increased through a plurality of levels as discussed above. As a result of the injected noise, an error should eventually be generated. The modem integrity performance signal is then fed to the display means 106 (FIG. 1) to record the modem integrity performance. Thus, modem integrity is monitored and displayed.

As shown in FIG. 2, interface test means 14 includes lamp means 258 to automatically indicate when the RS-232 signals; data terminal ready (DTR), data set ready (DSR), request to send (RTS), clear to send (CTS), carrier detect (CAR DET), are present between modem 20 and telecommunications anaylzer 10.

Telecommunications analyzer 10 may be operated in either the manual or automatic line test mode by selection of the proper mode on the front panel as shown in FIG. 3. In the automatic mode, analyzer 10 automatically sequences through each of the nine tests as previously described. In the manual mode any single line test may be selected by operating the correspond switch 117j–117g to "lock-in" the desired line test of continuous monitoring. For purposes of discussion the automatic mode of operation will be explained.

As shown in FIG. 2, control means 104 generates a test command signal which is fed to control signal generator means 120. Control signal generator means 120 generates a control signal corresponding to the parameter under test which is fed to signal summing means 110. This control signal is also fed to test signal generator means 118 to establish synchronization. As the test command signal is fed to control signal generator means 120, the test pattern signal corresponding to the particular line test is fed from the test signal generator means 118 to signal summing means 110 where a transmission line test signal is generated and transmitted over the transmission line 28. The transmission line test signal is received at a remote telecommunications analyzer 10 where the control signal and test signal are recovered as previously described. Specifically, the received signals are demodulated to recover the control signal and filtered to isolate the particular test pattern signal corresponding to the particular transmission line parameter under test. The recovered control signal is fed to the sequencer means 112 which generates a command signal corresponding to the particular parameter under test. This command signal is fed simultaneously to the parameter test selector means 122 to control the filtering of the test pattern signal and to the test signature generator means 114 to generate the signature signal corresponding to the parameter under test. The parameter test means continues to monitor the test pattern signal for transmission line performance for a predetermined time. The sequence means 112 automatically advances the transmission line test means to the subsequent test until terminated by the operator.

During each parameter test, the signature signal and transmission line performance signal for each parameter test are multiplexed to the dispay means to permanently record the transmission line performance. A template (not shown) is provided to overlay the recorder 150 with minimum - maximum performance specifications for each transmission line parameter to provide a visual time relation examination of the line performance. Thus, transmission line performance may be examined with relation to the overall telecommunications system performance to isolate system problems attributed to transmission line performance.

When in the modem integrity test mode or interface test mode as selected by switches 113, the telecommunications analyzer is coupled to a local modem 20.

as previously described, the modem integrity test mode and interface mode monitor the bit-error-rate and RS-232 interface operations respectively.

Thus, an inexpensive portable system analyzer capable of monitoring, displaying and recording parameters a plurality of performance with respect to time, simple enough for an unskilled technician to interpret and evalute is provided.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described.

What is claimed is:

1. A telecommunications analyzer for monitoring transmission line performance between a local and remote telecommunications analyzer: said telecommunications anaylzer comprising a transmitter means including a test signal generator means including circuitry to generate a predetermined test pattern signal corresponding to each of a plurality of transmission line parameters for transmission to a remote telecommunications analyzer, a control means including means to generate a plurality of command signals corresponding to each of said plurality of transmission line parameters to be monitored, said transmitter means coupled to said control means to receive said command signal to control generation of said predetermined test pattern signals, said transmitter means further including control signal generator means including circuity to generate a control signal corresponding to each of said plurality of transmission line parameters, said telecommunications analyzer further including signal summing means coupled to said transmitter means to receive said predetermined test pattern signal and said control signal, said signal summing means including circuitry to combine said predetermined test pattern signal and said control signal to generate a transmission line parameter test signal for transmission to a remote telecommunications analyzer; a receiver means to receive transmission line parameter test signals from a remote transmitting telecommunications anlayzer, said receiver means coupled to said signal summing means to receive incoming transmission line parameter test signals, said receiver means further including a control signal recovery means including circuitry to recover said control signals, said control signal recovery means coupled to said control means, said control means including circuitry to generate a command signal corresponding to each said transmission line parameter test signals, said receiver means further including a parameter selector means coupled to said control means to receive said command signals to selectively control the transmission of said predetermined test pattern signal to said parameter test means, said parameter test means including circuitry to recover each said predetermined test pattern signals and generate an output signal in response thereto, and a display means coupled to said parameter test means to receive said output signal, said display means including means to display the transmission line performance measured between said remote telecommunications analyzer and said local telecommunications analyzer with respect to time.

2. The telecommunications analyzer means of claim 1 wherein said control means includes circuitry to generate a predetermined discrete minimum scale and discrete maximum scale index signals in repsonse to said predetermined test pattern signal for display with respect to monitor transmission line performance.

3. The telecommunications analyzer of claim 2 wherein said receiver means includes multiplexer means coupled to said parameter test means and said control means to multiplex said predetermined minimum scale and maximum scale index signals and said predetermined test pattern signal with respect to time.

4. The telecommunications analyzer of claim 1 wherein said test signal generator means comprises a frequency generator means.

5. The telecommunications analyzer of claim 4 wherein said frequency generator means comprises a digital frequency synthesizer and modulator means.

6. The telecommunications analyzer of claim 4 wherein said control means comprises a digital sequencer means including circuitry to generate command signals to control said transmitter means in the generation of said predetermined test pattern signal.

7. The telecommunications analyzer of claim 1 wherein said parameter test means includes a phase jitter recovery means including circuitry to monitor the phase jitter of said predetermined test pattern signal experienced on the transmission line respect to time.

8. The telecommunications analyzer of claim 7 wherein said phase jitter recovery means comprises a phase lock loop.

9. The telecommunications analyzer of claim 1 wherein said parameter test means includes an envelope delay recovery means including circuitry to monitor the envelope delay of said predetermined test pattern signal experienced on the transmission line with respect to time.

10. The telecommunications analyzer of claim 1 wherein said parameter test means includes a gain hit recovery means to monitor the gain hit of said predetermined test signal pattern experienced of the transmission line with respect to time.

11. The telecommunications analyzer of claim 1 wherein said parameter test means includes a frequency offset recovery means including circuitry to monitor the frequency offset of said predetermined test pattern signal experienced on the transmission line with respect to time.

12. The telecommunications analyzer of claim 1 wherein said parameter test means includes an impulse analyzer means to monitor the impulse noise of said predetermined test pattern signal experienced of the transmission line with respect to time.

13. The telecommunications analyzer of claim 12 wherein said impulse analyzer means comprises an absolute value circuit to derive the absolute value of said incoming predetermined test pattern signal and comparator means to compare said absolute value with at least one predetermined voltage level and means to generate an output signal when said absolute value exceeds said predetermined level.

14. The telecommunications analyzer of claim 1 wherein said parameter test means includes an automatic gain control and amplitude modulator detector to detect the voltage value of said predetermined test pattern signal with respect to time.

15. The telecommunications analyzer of claim 14 wherein said parameter test means which further includes counter means to generate a digital output signal representative of the voltage value detected.

16. The telecommunications analyzer of claim 14 wherein said parameter test means further includes a phase jitter recovery means coupled to said automatic gain control and amplitude modulator detector, said phase jitter recovery means including circuitry to monitor the phase jitter of said predetermined test pattern signal experienced on the transmission line with respect to time.

17. The telecommunications analyzer of claim 16 wherein said phase jitter recovery means comprises a phase lock loop.

18. The telecommunications analyzer of claim 14 wherein said parameter test means further includes an envelope delay recovery means coupled to said automatic gain control and amplitude modulator detector, said envelope delay recovery means including circuitry to monitor the envelope delay of said test pattern signal experienced on the transmission line with respect to time.

19. The telecommunications analyzer of claim 14 wherein said parameter test means further includes a gain hit recovery means coupled to said automatic gain control and amplitude modular detector, said gain hit recovery means including circuitry to monitor the gain hit of said test pattern signal experienced on the transmission line with respect to time.

20. The telecommunications analyzer of claim 14 wherein said parameter test means further includes a frequency offset recovery means coupled to said automatic gain control amplitude modulator detector, said frequency offset recovery means including circuitry to monitor the frequency offset of said test pattern signal experienced on the transmission line with respect to time.

21. The telecommunications analyzer of claim 14 wherein said parameter test means further includes a digital to analog convertor to convert the digital output of said automatic gain control and amplitude modulator detector to an analog value.

22. The telecommunications analyzer of claim 21 wherein said analog output of said automatic gain control and amplitude modulator detector comprises a C-message noise test signal corresponding to said predetermined test pattern signal to monitor the C-message noise experienced on the transmission line with respect to time.

23. The telecommunications analyzer of claim 21 wherein said analog output of said automatic gain control and amplitude modulator detector comprises a frequency response test signal corresponding to said predetermined test pattern signal to monitor the frequency response experienced on the transmission line with respect to time.

24. The telecommunications analyzer of claim 21 wherein said analog output of said automatic gain control and amplitude modulator detector comprises an echo suppressor test signal corresponding to said predetermined test pattern signal to monitor echo suppressor operations with respect to time.

25. The telecommunications analyzer of claim 21 wherein said analog output of said automatic gain control and amplitude modulator detector comprises a non-linear distortion test signal corresponding to said predetermined test pattern signal to monitor the non-linear distortion experienced on the transmission line with respect to time.

26. The telecommunications analyzer of claim 1 wherein said control means includes a digital sequencer means having circuitry to generate a plurality of command signals correspondign to each said predetermined test pattern signal in sequence.

27. The telecommunications analyzer of claim 26 wherein said digital sequencer means comprises a multiple bit read only memory.

28. The telecommunications analyzer of claim 26 wherein said control means further includes a signature generator means to generate a plurality of signature signals each corresponding to one of said predetermined test pattern signals.

29. The telecommunications analyzer of claim 28 wherein said signature generator means includes circuitry to generate sequentially a minimum scale, maximum scale index and signature signal for display.

30. The telecommunications analyzer of claim 29 wherein said receiver means includes multiplexer means coupled to said parameter test means and said control means to multiplexer said minimum scale, maximum scale index and signature signal for each said parameter tests sequentially with repsonse to time.

31. The telecommunications analyzer of claim 1 wherein said test signal generator means comprises a frequency generator means including means to selectively generate one of a plurality of said predetermined test pattern signals in repsponse to said corresponding command signals from said control means.

32. The telecommunications analyzer of claim 31 wherein said frequency generator means comprises a digital frequency synthesizer and modulator means.

33. The telecommunications analyzer of claim 1 wherein said control signal generator means comprises a modulator means.

34. The telecommunications analyzer of claim 33, wherein said modulator means comprises a binary frequency shift key modulator.

35. The telecommunications analyzer of claim 1 wherein said parameter test selector means comprises digital selective receiver filters and gain sealing means controlled by said command signals from said control means to selectively control said filters and gain scaling means.

36. The telecommunications analyzer of claim 1 wherein said control signal recovery means comprises a demodulator means coupled to said signal summing means to demodulate said predetermined test pattern signal and decoder means coupled to said demodulator means to decode said demodulated predetermined test pattern test signal to recover said control signal corresponding to said predetermined test pattern signal.

37. The telecommunications analyzer of claim 1 further including a modem integrity test means coupled between said control means and the modem under test, said modem integrity means comprising a transmission line simulator means and a modem test signal generator means, said modem test signal generator means including circuitry to generate a digital test signal fed to the modulator of the modem, said transmission line simulator means coupled to the modulator to receive said modulated digital test signal, said transmission line simulator means including circuitry to impose transmission line distortion to said analog test signal, said distorted analog test signal fed to the demodulator of the modem to demodulate said distorted modem integrity test signal and comparator means to compare said distorted demodulated signal with a reference signal, said comparator means including circuitry to generate a bit error signal when said comparison exceeds a predetermined level.

38. The telecommunications analyzer of claim 37 wherein said modem integrity test means includes noise injector means to inject noise on said digital test signal.

39. The telecommunications analyzer of claim 38 wherein said noise injector means includes a means to vary the noise injected on said digital test signal.

40. The telecommunications analyzer of claim 1 further including interface test means including circuit means and visual indicator means coupled to the transmission lines to receive and indicate the presence of preselected control line signals.

* * * * *